(12) United States Patent
Fuhs et al.

(10) Patent No.: US 7,324,525 B2
(45) Date of Patent: Jan. 29, 2008

(54) METHOD AND APPARATUS FOR COALESCING ACKNOWLEDGE PACKETS WITHIN A SERVER

(75) Inventors: Ronald E. Fuhs, Rochester, MN (US); Calvin C. Paynton, Byron, MN (US); Steven L. Rogers, Rochester, MN (US); Nathaniel P. Sellin, Rochester, MN (US); Scott M. Willenborg, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 11/008,799

(22) Filed: Dec. 9, 2004

(65) Prior Publication Data

US 2006/0126638 A1 Jun. 15, 2006

(51) Int. Cl.
*H04L 12/28* (2006.01)
*H04L 12/66* (2006.01)
(52) U.S. Cl. .................. 370/395.7; 370/389; 370/412
(58) Field of Classification Search ................ 370/230, 370/235, 328, 395.7, 412, 428
See application file for complete search history.

(56) References Cited

U.S. PATENT DOCUMENTS 6,944,170 B2 * 9/2005 Minkenberg ................. 370/411
7,133,943 B2 * 11/2006 Carnevale et al. ............. 710/52
2004/0167992 A1 * 8/2004 Carnevale et al. .......... 709/250

* cited by examiner

*Primary Examiner*—Afsar Qureshi
(74) *Attorney, Agent, or Firm*—Dillon & Yudell LLP

(57) ABSTRACT

A method for coalescing acknowledge packets within a server is disclosed. A Read Request queue having multiple queue pair entries is provided. Each of the queue pair entries includes a packet sequence number (PSN) field and an indicator field. In response to a receipt of a Write Request packet, an indicator field of a queue pair entry is set to indicate that an Ack packet has been queued within the queue pair entry, and a PSN of the Write Request packet is written into a PSN field of the queue pair entry. In addition, a Queue Write Pointer is maintained to point to the queue pair entry. In response to a receipt of a Read Request packet, the indicator field of the queue pair entry is set to indicate that a Read Request packet has been queued within the queue pair entry, and a PSN of the Read Request packet is written into the PSN field of the queue pair entry. Also, the Queue Write Pointer is advanced to point to a queue pair entry that is subsequent to the queue pair entry.

5 Claims, 5 Drawing Sheets

|  | PSN | READ REQUEST INDICATOR |  |
|---|---|---|---|
| Q WRITE POINTER -> ENTRY 0 | 1 | OFF | <- Q READ POINTER |
| ENTRY 1 | | | |
| ENTRY 2 | | | |

*Figure 5a*

|  | PSN | READ REQUEST INDICATOR |  |
|---|---|---|---|
| Q WRITE POINTER -> ENTRY 0 | 2 | OFF | <- Q READ POINTER |
| ENTRY 1 | | | |
| ENTRY 2 | | | |

*Figure 5b*

|  | PSN | READ REQUEST INDICATOR |  |
|---|---|---|---|
| ENTRY 0 | 3 | ON | <- Q READ POINTER |
| Q WRITE POINTER -> ENTRY 1 | | | |
| ENTRY 2 | | | |

*Figure 5c*

|  | PSN | READ REQUEST INDICATOR |
|---|---|---|
| ENTRY 0 | 3 | ON |
| ENTRY 1 | 4 | ON |
| ENTRY 2 |  |  |

Q READ POINTER points to ENTRY 0. Q WRITE POINTER points to ENTRY 2.

*Figure 5d*

|  | PSN | READ REQUEST INDICATOR |
|---|---|---|
| ENTRY 0 | 3 | ON |
| ENTRY 1 | 4 | ON |
| ENTRY 2 | 5 | OFF |

Q READ POINTER points to ENTRY 1. Q WRITE POINTER points to ENTRY 2.

*Figure 5e*

|  | PSN | READ REQUEST INDICATOR |
|---|---|---|
| ENTRY 0 | 3 | ON |
| ENTRY 1 | 4 | ON |
| ENTRY 2 | 6 | OFF |

Q WRITE POINTER points to ENTRY 2. Q READ POINTER points to ENTRY 2.

*Figure 5f*

METHOD AND APPARATUS FOR COALESCING ACKNOWLEDGE PACKETS WITHIN A SERVER

BACKGROUND OF THE INVENTION

1. Technical Field

The present invention relates to computer servers in general, and, in particular, to a method and apparatus for managing read/write requests within computer servers. Still more particularly, the present invention relates to a method and apparatus for coalescing acknowledge packets within a computer server.

2. Description of Related Art

Infiniband provides a hardware message passing mechanism that can be used for inter-process communications between computer nodes. Typically, a consumer can access the Infiniband message passing mechanism by posting send/receive messages to send/receive work queues on a host channel adapter. The consumer can retrieve the results of these messages from a completion queue.

A host channel adapter at a source node segments outbound messages and then sends the outbound messages to a destination node. A host channel adapter at a destination node reassembles inbound messages and then places the inbound messages in a memory space designated by a consumer of the destination node.

Reliable connected service requires that Acknowledge (Ack) or Response packets be sent by a Responder device for received request packets. A requester correlates Ack/Response packets to it's outstanding requests using packet sequence numbers (PSNs). The PSN of Ack/Response packets must be kept in the same order as the original requests. However, the Infiniband architecture allows coalescing of multiple Ack/Response packets into a single Ack/Response packet, which reduces the number of packets on the link such that bandwidth will be improved. For example, if a Responder device receives Write Requests with PSNs of 2, 3 and 4, the Responder device could send a single Ack packet with a PSN of 4.

For obvious reasons, responses to Read Requests cannot be coalesced; however, a Read Response can coalesce Write Request Acks. For example, if a Responder device receives Write Request Packet PSN=1, Read Request Packet PSN=2, and Write Request Packet PSN=3 in that order, the Responder device may respond with Read Response PSN=2 and Ack PSN=3. Write Packet PSN=1 is implicitly acknowledged by the Read Response of PSN=2.

In order to meet the goal of improving link bandwidth by reducing the number of Ack packets, special considerations in the design of a Responder device are required. In general, it is desirable to coalesce Ack packets for Write Request packets when the outgoing link is busy, and send the Acks packets when the link is idle. However, the rules of coalescing must still be observed; that is, each Read Response must be sent explicitly and cannot be coalesced.

In addition, it is essential that deadlocks be avoided. Deadlocks arise when the reception of an incoming packet is prevented due to the inability to transmit a packet. Therefore, a mechanism is needed to allow an "essentially infinite" number of Write Request packets to be received and have Ack packets scheduled for them without requiring the Ack packets to be transmitted. The greater the independence between the receiving side and the transmitting side of a Responder device, the better the performance and the easier to avoid deadlock conditions.

One known method of accomplishing the above-mentioned objectives in a Responder device is to use a separate Read Request queue to hold received Read Requests waiting for execution, and an independent Ack/Response queue for response packets waiting for transmission. But with such arrangement, the allowance of Read Responses to coalesce Ack packets becomes a fairly complex problem. The above-mentioned arrangement also makes it difficult to ensure that Ack packets and Read Responses will be transmitted in a correct PSN order.

Consequently, it would be desirable to provide an improved method and apparatus for coalescing Ack/Response packets within a computer server.

SUMMARY OF THE INVENTION

In accordance with a preferred embodiment of the present invention, a Read Request queue having multiple queue pair entries is provided. Each of the queue pair entries includes a packet sequence number (PSN) field and an indicator field. In response to a receipt of a Write Request packet, an indicator field of a queue pair entry is set to indicate that an Ack packet has been queued within the queue pair entry, and a PSN of the Write Request packet is written into a PSN field of the queue pair entry. In addition, a Queue Write Pointer is maintained to point to the queue pair entry.

In response to a receipt of a Read Request packet, the indicator field of the queue pair entry is set to indicate that a Read Request packet has been queued within the queue pair entry, and the PSN of the Read Request packet is written into the PSN field of the queue pair entry. Also, the Queue Write Pointer is advanced to point to a queue pair entry that is subsequent to the queue pair entry.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 5*a*-5*f* graphically illustrate the present invention using a three-entry Read Request queue.

DETAILED DESCRIPTION OF A PREFERRED EMBODIMENT

Figure 1:
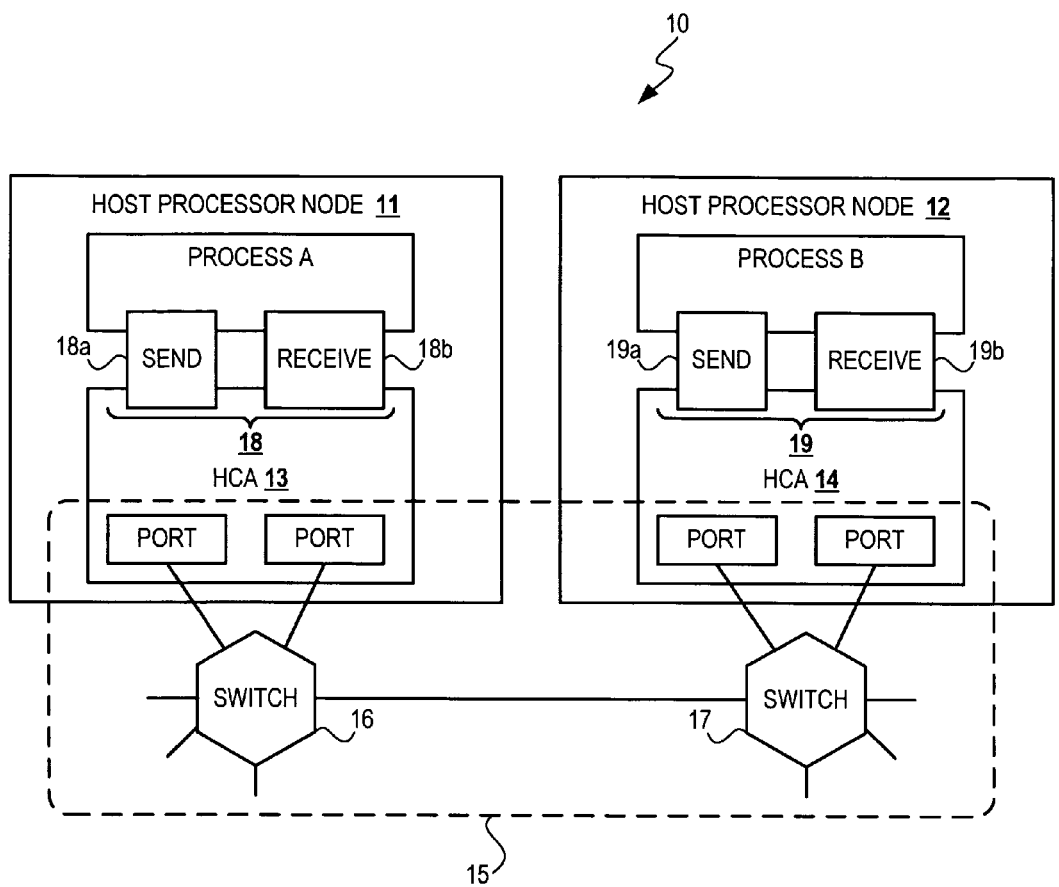
FIG. 1 is a block diagram of a portion of a distributed computer system, in accordance with a preferred embodiment of the present invention.

Referring now to the drawings and in particular to FIG. 1, there is illustrated a block diagram of a portion of a distributed computer system, in accordance with a preferred embodiment of the present invention. As shown, a distributed computer system 10 includes a host processor node 11 and a host processor node 12. Host processor node 11 includes a host channel adapter 13. Host processor node 12 includes a host channel adapter 14. Distributed computer system 10 also includes a system area network (SAN) fabric 15 having a switch 16 and a switch 17. Within SAN fabric 15, a first link is formed between host channel adapter 13 and switch 16, a second link is formed between switch 16 and switch 17, and a third link is formed between host channel adapter 14 and switch 17.

Host processor node 11 includes a process A. Host processor node 12 includes a process B. Process A interacts with host channel adapter 13 through a queue pair 18 having a send queue 18a and a receive queue 18b. Process B interacts with host channel adapter 14 through a queue pair 19 having a send queue 19a and a receive queue 19b.

During operation, process A initiates a message request by posting work queue elements to send queue 18a. A message is defined as an application-defined unit of data exchange, which is a primitive unit of communication between cooperating processes. The message request of process A is referenced by a gather list contained in a send work queue element. Each data segment in the gather list points to a virtually contiguous local memory space, which contains a part of the message. Host channel adapter 13 reads the work queue element and segments the message stored in virtual contiguous local memory space into multiple data packets. The data packets are routed through SAN fabric 15, and are then acknowledged by host processor node 12. If not successively acknowledged, the data packet is re-transmitted by host processor node 11.

Figure 2:
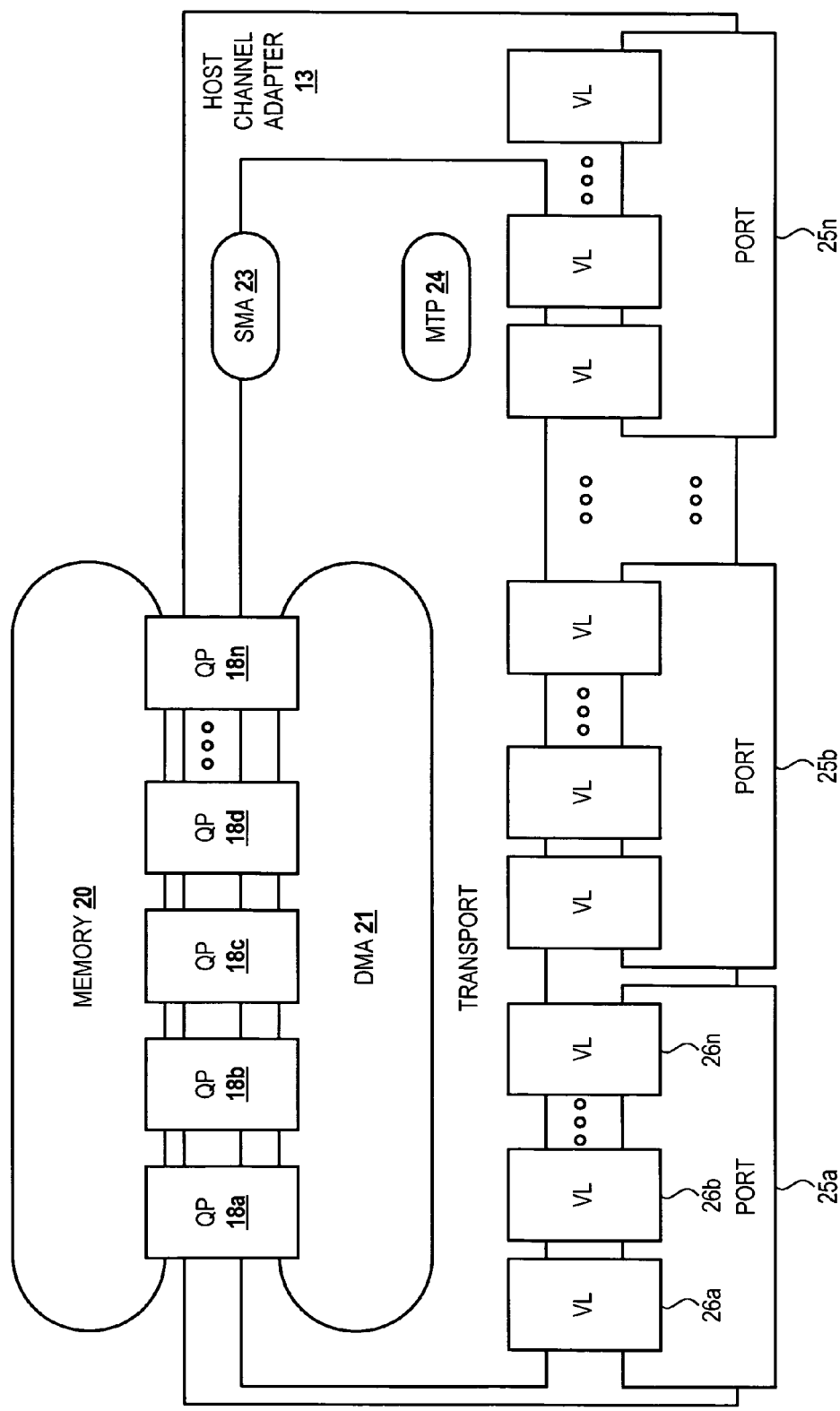
FIG. 2 is a block diagram of a host channel adapter within the distributed computer system from FIG. 1, in accordance with a preferred embodiment of the present invention.

With reference now to FIG. 2, there is depicted a block diagram of host channel adapter 13, in accordance with a preferred embodiment of the present invention. As shown, host channel adapter 13 includes multiple queue pairs, such as queue pairs 18a-18n, which are used to transfer messages to host channel adapter ports 25a-25n. Data to host channel adapter ports 25a-25n are channeled through virtual lanes 26a-26n. A subnet manager agent 23 communicates with a subnet manager for the purpose of configuring host channel adapter 13. A memory translation and protection module 24 translates virtual addresses to physical addresses and validates access rights. A direct memory access (DMA) module 21 provides DMA operations via a memory 20.

A single host channel adapter, such as host channel adapter 13, can support thousands of queue pairs. Each queue pair includes a send work queue and a receive work queue. The send work queue sends channel and memory semantic messages. The receive work queue receives channel semantic messages. A consumer calls an operating system specific programming interface to place work requests onto a work queue.

Figure 3:
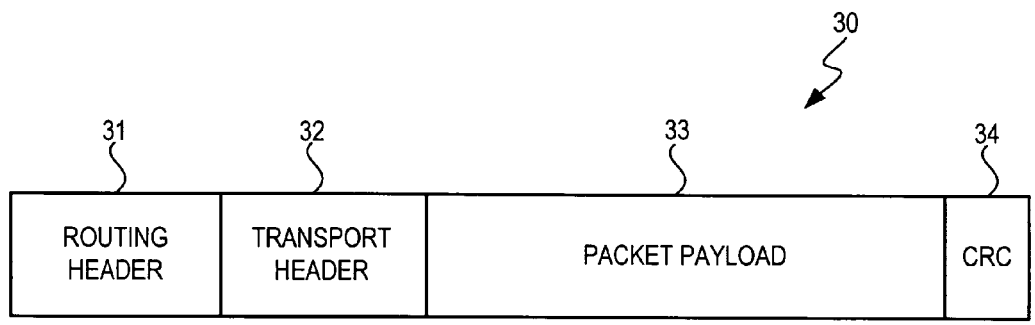
FIG. 3 is a block diagram of a data packet used within the distributed computer system from FIG. 1, in accordance with a preferred embodiment of the present invention.

Referring now to FIG. 3, there is illustrated a block diagram of a data packet used within host channel adapter 13, in accordance with a preferred embodiment of the present invention. As shown, a data packet 30 includes a routing header 31, a transport header 32, a packet payload 33 and a cyclic redundancy check (CRC) field 34. Routing header 31 identifies source and destination ports for data packet 30. Transport header 32 specifies a destination queue pair for data packet 30. Transport header 32 also provides information, such as an operation code, a packet sequence number (PSN), and a partition for data packet 30. Packet payload 33 contains data, and CRC field 34 is used for error checking.

The present invention provides a mechanism to coalesce Ack and Read Responses with a minimum of additional connection context added to a queue pair. The present invention makes use of the fact that Infiniband (and the IETF proposed standard for RDMA over IP) requires Responder devices to have a Read Request queue. The Read Request queue is made up of N queue entries, each entry holding the PSN of a Read Request along with other information necessary to perform a Read operation. The number of entries N in the Read Request queue within a queue pair is constant throughout the lifespan of a virtual connection, and such number is advertised to all potential Requestors. All Requestors are obligated to not overflow the Read Request queue of a queue pair.

Figure 4:
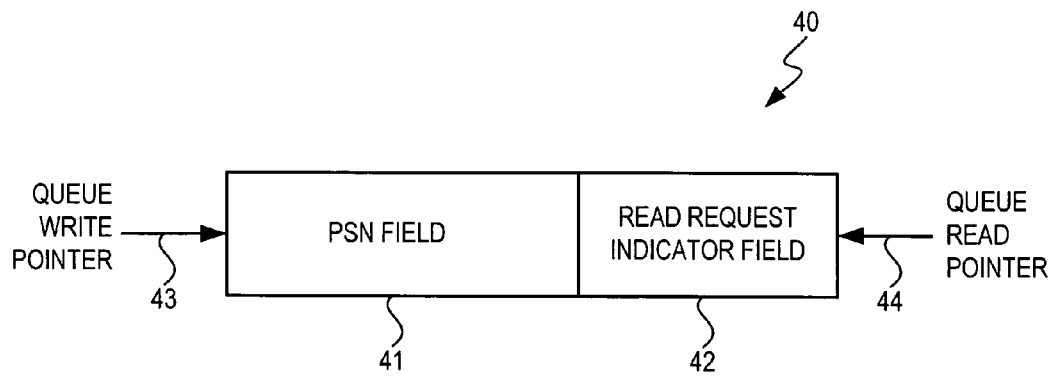
FIG. 4 is a block diagram of a queue pair entry within a Read Request Queue of the host channel adapter from FIG. 2, in accordance with a preferred embodiment of the present invention.

With reference now to FIG. 4, there is illustrated a block diagram of a queue pair entry within a Read Request queue, in accordance with a preferred embodiment of the present invention. As shown, a queue pair entry 40 includes a PSN field 41 and a Read Request indicator field 42. PSN field 41 contains a PSN. Indicator field 42 indicates if queue pair entry 40 is holding an Ack response or a Read Request. Indicator field 42 is preferably one bit wide.

In addition, a Queue Write Pointer 43 and a Queue Read Pointer 44 are used for placing a valid PSN into queue pair entry 40 and for determining whether an Ack response or a Read response must be sent, respectively. Specifically, the logic in a receiving side uses Queue Write Pointer 43 to determine which queue pair entry to write a PSN for a Received Request. The logic in a transmitting side uses Queue Read Pointer 44 to determine which queue pair entry should be used to generate an Ack/Read response.

Also, for the present invention, one additional Read Request queue entry is required in the queue pair than the number of Read Request queue entries advertised to potential Requestors. In other words, if the number of Read Request queue entries advertised to the potential Requestors is N, then the total number of Read Request queue entries needs to be N+1. The one extra Read Request queue entry is necessary to permit the queue pair to accept the number of Read Requests that it has advertised for the connection and still queue Ack packets for subsequent Write Requests. In other words, a queue pair advertising a two-entry Read Request Queue, for example, would actually implement a three-entry Read Request Queue.

In accordance with a preferred embodiment of the present invention, when a Request packet is received, the Responder writes the PSN of the Request packet into queue pair entry 40 that is indexed by Queue Write Pointer 43. If the Request packet is a Write Request packet, the bit in indicator field 42 of queue pair entry 40 is set to indicate that an Ack packet has been queued within, and Queue Write Pointer 43 is not advanced after a PSN has been written into queue pair entry 40. If the Request packet is a Read Request packet, the bit in indicator field 42 of queue pair entry 40 is set to indicate that a Read Request has been queued within, and Queue Write Pointer 43 is then advanced by one entry so that the PSN of a next Request packet will be written into a queue pair entry subsequent to queue pair entry 40. As a result, Ack packets for Write Requests are allowed to be coalesced (or overlaid) by subsequent Ack packets and Read Requests, but Read Requests are not coalesced.

The transmitting side uses Queue Read Pointer 44 to determine which Write Request Queue entry to use when sending an Ack/Read Response packet. The transmitting side reads the PSN and the Ack/Read Request indicator from the entry pointed by Queue Read Pointer 44. If the bit in indicator field 42 is inactive, the read indicator sends an Ack packet with the PSN indicated and does not advance Queue Read Pointer 44. If the bit in indicator field 42 is active, the read indicator performs the indicated Read operation, returns the data in a Read Response with the PSN indicated, and advances Queue Read Pointer 44 by one queue pair entry.

The present invention can be illustrated by the following example using a three-entry Read Request queue, as shown in FIGS. 5a-5f. After the receipt of a first Write Request, the PSN in entry 0 is set to 1 for the first Write Request, and the Read Request Indicator in entry 0 is kept off to indicate a Write Request. Both the Queue Write Pointer and the Queue Read Pointer are pointed to entry 0 of the Read Request queue, as shown in FIG. 5a.

After the receipt of a second Write Request, the PSN in entry 0 is set to 2 (overlaying the PSN of the first Write Request) for the second Write Request, and the Read Request Indicator in entry 0 is kept off to indicate a Write Request. Both the Queue Write Pointer and the Queue Read Pointer are pointed to entry 0 of the Read Request queue, as depicted in FIG. 5b.

After the transmission of an Ack packet with a PSN=2 in entry 0 and the receipt of a first Read Request, the PSN in entry 0 is set to 3 (overlaying the PSN of the second Write Request) for the first Read Request, and the Read Request Indicator in entry 0 is turned on to indicate a Read Request. In addition, the Queue Write Pointer is advanced to entry 1 of the Read Request queue, but the Queue Read Pointer remains pointing to entry 0 of the Read Request queue, as shown in FIG. 5c.

After the receipt of a second Read Request, the PSN in entry 1 is set to 4 for the second Read Request, and the Read Request Indicator in entry 1 is turned on to indicate a Read Request. In addition, the Queue Write Pointer is advanced to entry 2 of the Read Request queue, but the Queue Read Pointer remains pointing to entry 0 of the Read Request queue, as depicted in FIG. 5d.

After the transmission of a Read Response packet with a PSN=3 in entry 0 and the receipt of a third Write Request, the PSN in entry 2 is set to 5 for the third Write Request, and the Read Request Indicator in entry 2 is kept off to indicate a Write Request. In addition, the Queue Write Pointer is not advanced, and the Queue Read Pointer is advanced to entry 1 of the Read Request queue, as shown in FIG. 5e.

After the transmission of a Read Response packet with a PSN=4 in entry 1 and the receipt of a fourth Write Request, the PSN in entry 2 is set to 6 for the fourth Write Request (overlaying the PSN of the third Write Request), and the Read Request Indicator in entry 2 is kept off to indicate a Write Request. In addition, the Queue Write Pointer remains pointing to entry 2 of the Read Request queue, but the Queue Read Pointer is advanced to entry 2 of Read Request queue, as depicted in FIG. 5f.

For a three-entry Read Request queue, anywhere from three to six Response packets could have been sent with varying timing of the notification on the transmitting side, and up to three Acks could have been either coalesced or sent.

As has been described, the present invention provides a method and apparatus for coalescing Ack/Response packets within a computer server. The actual transmission of an Ack/Read Response packet by the transmitting side is initiated by any of several different means according to the specifics of the implementation. The advantage of the present invention is that whenever the transmitting side receives notification of a pending response, the Ack or Read Response packet sent will be for the most recent PSN that the Ack ordering and coalescing rules allow, regardless of the time delay for the transmission to actually take place.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for coalescing acknowledge (Ack) packets within a computer server, said method comprising:
    providing a Read Request queue having a plurality of queue pair entries, wherein each of said queue pair entries includes a packet sequence number (PSN) field and an indicator field;
    in response to a receipt of a Write Request packet:
        setting an indicator field of a queue pair entry to indicate that an Ack packet has been queued within said queue pair entry;
        writing a PSN of said Write Request packet into a PSN field of said queue pair entry; and
        maintaining a Queue Write Pointer to point to said queue pair entry;
    in response to a receipt of a Read Request packet:
        setting said indicator field of said queue pair entry to indicate that a Read Request packet has been queued within said queue pair entry;
        writing a PSN of said Write Request packet into said PSN field of said queue pair entry; and
        advancing said Queue Write Pointer to point to a queue pair entry subsequent to said queue pair entry.

2. The method of claim 1, wherein said Queue Read Pointer indicates which Write Request queue entry should be used when sending an Ack/Read Response packet.

3. The method of claim 1, wherein said method further includes sending an Ack packet when a bit within said indicator field is inactive, and said Queue Read Pointer is not advanced.

4. The method of claim 1, wherein said method further includes performing a Read operation, returning data in a Read Response with an PSN indicated, and advancing Queue Read Pointer by one queue pair entry when a bit in said indicator field is active.

5. The method of claim 1, wherein said method further includes providing one additional queue pair entry in said Read Request queue than the number of queue pair entries advertised to potential Requestors.

* * * * *